US011471961B2

(12) United States Patent
Chi

(10) Patent No.: US 11,471,961 B2
(45) Date of Patent: Oct. 18, 2022

(54) METHOD FOR MACHINING PLATE MATERIAL BY USING LINEAR SAW AND NUMERICAL CONTROL SAW MACHINE APPARATUS

(71) Applicant: DONGGUAN CITY YISONG HIGH TECHNOLOGY CO., LTD., Guangdong (CN)

(72) Inventor: Yihui Chi, Guangdong (CN)

(73) Assignee: DONGGUAN CITY YISONG HIGH TECHNOLOGY CO., LTD., Guangdong (CN)

( * ) Notice: Subject to any disclaimer, the term of this patent is extended or adjusted under 35 U.S.C. 154(b) by 107 days.

(21) Appl. No.: 16/762,712

(22) PCT Filed: Nov. 9, 2018

(86) PCT No.: PCT/CN2018/114800
§ 371 (c)(1),
(2) Date: May 8, 2020

(87) PCT Pub. No.: WO2019/091451
PCT Pub. Date: May 16, 2019

(65) Prior Publication Data
US 2021/0170510 A1    Jun. 10, 2021

(30) Foreign Application Priority Data
Nov. 10, 2017  (CN) .......................... 201711105364.6

(51) Int. Cl.
*B23D 57/00* (2006.01)
*B23D 59/00* (2006.01)

(52) U.S. Cl.
CPC ....... *B23D 57/0007* (2013.01); *B23D 57/003* (2013.01); *B23D 59/001* (2013.01)

(58) Field of Classification Search
CPC .. B23D 49/007; B23D 51/163; B23D 57/003; B23D 51/125; B23D 57/0007
(Continued)

(56) References Cited

U.S. PATENT DOCUMENTS 4,236,432 A * 12/1980 Kawakami ........... B23D 49/007
83/747
4,484,502 A * 11/1984 Ebner ................ B23D 57/0007
125/12

(Continued)

FOREIGN PATENT DOCUMENTS

| CN | 101817209 A | 9/2010 |
| CN | 203765813 U | 8/2014 |

(Continued)

OTHER PUBLICATIONS

International Preliminary Report on Patentability and Written Opinion dated May 12, 2020 received in International Patent Application No. PCT/CN20108/114800 together with an English language translation.

(Continued)

*Primary Examiner* — Ghassem Alie
*Assistant Examiner* — Samuel A Davies
(74) *Attorney, Agent, or Firm* — Scully Scott Murphy & Presser

(57) ABSTRACT

Provided are a method for machining a plate material by using a linear saw, and a numerical control saw machine apparatus. The numerical control saw machine apparatus includes: two carrying mechanisms, which are connected to two ends of a linear saw respectively; at least one control motor, configured for adjusting a distance between the two carrying mechanisms; and a pair of vibration motors, configured for driving the vibration of the linear saw, wherein, the distance between the two carrying mechanisms is
(Continued)

adjusted by the control motor based on a monitored change in a torque of the control motor.

19 Claims, 2 Drawing Sheets

(58) Field of Classification Search
USPC .......................................................... 83/956
See application file for complete search history.

(56) References Cited

U.S. PATENT DOCUMENTS

| | | | | |
|---|---|---|---|---|
| 5,100,270 A | * | 3/1992 | Dowdle | B23Q 11/0042 |
| | | | | 144/252.1 |
| 5,299,483 A | * | 4/1994 | Ber-Fong | B26D 1/54 |
| | | | | 83/870 |
| 9,283,688 B2 | * | 3/2016 | Tillmann | B26D 1/547 |
| 2001/0004891 A1 | * | 6/2001 | Holzmuller | B28D 5/042 |
| | | | | 125/21 |
| 2016/0107334 A1 | * | 4/2016 | Rhee | B23D 51/125 |
| | | | | 125/16.01 |
| 2016/0236291 A1 | * | 8/2016 | Weimer | B23D 59/001 |
| 2018/0153179 A1 | | 6/2018 | Driscoll | |

FOREIGN PATENT DOCUMENTS

| | | | |
|---|---|---|---|
| CN | 107900454 A | 4/2018 | |
| CN | 207508425 U | 6/2018 | |
| WO | WO2016/062249 A1 * | 4/2016 | ......... B26D 57/0007 |

OTHER PUBLICATIONS

International Search Report dated Feb. 19, 2019 received in International Patent Application No. PCT/CN2018/114800 together with English language translation.

\* cited by examiner

METHOD FOR MACHINING PLATE MATERIAL BY USING LINEAR SAW AND NUMERICAL CONTROL SAW MACHINE APPARATUS

CROSS-REFERENCE TO RELATED APPLICATIONS

The present patent application claims priority of Chinese Patent Application No. 201711105364.6 filed on Nov. 10, 2017, the disclosure of which is incorporated herein by reference in its entirety as part of embodiments of the present disclosure.

TECHNICAL FIELD

The present disclosure relates to a field of plate material machining, and more particularly, to a method for machining a plate material using a linear saw and a numerical control saw machine apparatus.

BACKGROUND

Currently, cutting dies on the market mainly include wooden cutting dies, plastic cutting dies, iron or aluminum cutting dies, acrylic cutting dies, etc., but the most important cutting dies are wooden cutting dies. A wooden cutting die is to open a cutter gap in line with a size of a die cutting blade on a wooden plate with a certain thickness according to a shape of a product to be die-cut, the cutter gap has a position map consistent with the product to be die-cut, and has portions on both sides thereof connected by a bridge position to prevent it from falling off; then the blade is inserted into the cutter gap; a width of the cutter gap on the cutting die plate should be adapted to a width of a die cutter; and two sidewalls of the gap are closely matched with the blade to fix the die cutter.

A thickness of the die cutting blade is 0.45 mm, 0.53 mm, 0.71 mm, etc., and the thickness of the wooden plate used in the industry is usually about 10 mm to 18 mm, of which 18 mm is the most commonly used thickness. Meanwhile, a mechanical cutter for machining the cutting die plate has a too small diameter and its blade length is limited, so in general, an effective thickness of the cutting die plate machined with the mechanical cutter can only reach about 3 mm to 5 mm. In this way, the cutting die plate is greatly limited in effective machining thickness when machined with the mechanical cutter.

In particular, after the die cutting blade is mounted in the cutter gap of the cutting die plate, a position of a blade edge of the die cutting blade needs to be kept consistent with a pattern to be die-cut, which requires that the higher the positional accuracy of the cutter gap of the cutting die plate, the better; meanwhile, the die cutting blade needs to be kept perpendicular to the cutting die plate after inserted into the cutter gap to reduce stress acting on side faces of the die cutting blade during die cutting; otherwise, inclination or distortion can occur to the die cutting blade when the side faces thereof are subjected to stress, which further reduces positional accuracy of die cutting.

Usually, when machining a cutter gap on a cutting die plate, a width (M) of the cutter gap is narrow compared to a depth (H) of the cutter gap, and the depth (H) of the cutter gap: the width (M) of the cutter gap>10:1, so, currently applicable machining tools and machining means are limited to achieve high-precision machining of the cutter gap on the cutting die plate, which will be explained below with most common machining of a cutter gap with a width of 0.71 mm on a cutting die plate with a thickness of 18 mm as an example:

In a first machining technology: a cutter gap on a cutting die plate is machined with a laser cutting machine in a non-contact manner. Because laser is numerically controlled and the machine itself does not contact the cutting die plate, positional accuracy of the cutter gap can be guaranteed; however, laser machining belongs to thermal machining, in which the cutting die plate is sintered by laser beams with a high temperature, and a width of the cutter gap sintered is affected by many factors such as laser light path length, environmental temperature change, laser generator stability, and change in machined cutting die plate material, so that accuracy of the cutter gap width cannot be guaranteed; in addition, both walls of the cutter gap after laser machining are not smooth, with charred carbon residues left thereon, and these residues will be dropped by force after a blade is mounted in the cutter gap, thereby widening the cutter gap, affecting clamping force of the cutter gap, making the die cutting blade tilt in or even fall out of the cutter gap during die-cutting on the cutting die plate, and reducing precision and quality of die cutting the cutting die plate, which is a major disadvantage of laser machining the cutting die plate.

In a second machining technology: a cutter gap on a cutting die plate is machined with a mechanical cutter in a contact manner. Such contact machining with a mechanical cutter usually makes use of rigidity of a cutter itself to cut a material; and rigidity of the cutter guarantees possibility of high machining accuracy. However, when a cutter gap with a width of 0.71 mm is machined on a cutting die plate with a thickness of 18 mm, because a depth-to-width ratio of the cutter gap on the cutting die plate reaches 25:1, which is far greater than 10:1, it is impossible to perform normal cutting with a thin and long mechanical cutter such as a milling cutter, a drill, or other rigid cutter due to the limitation by a material of the current mechanical cutter; in addition, there are many unfavorable factors such as cutters being easily broken, small cutting amount each time, and extremely slow machining speed.

At present, a relatively ideal machining technology with a machining tool is reciprocating cutting with a linear saw, which can have a gap with a large depth-to-width ratio machined on a workpiece, and when it is applied to cutting die plate machining, can enable a cutter gap with a large depth-to-width ratio machined on a cutting die plate.

SUMMARY

According to an aspect of the present disclosure, a method of processing a board using a linear saw is provided, which includes: monitoring tensile forces on two ends of the linear saw by monitoring torque of a servo motor configured for controlling tensile forces on two ends of the linear saw, when machining the plate material with the linear saw; quickly fine-tuning and reducing a distance between the two ends of the linear saw and enable the torque of the servo motor to be restored to or maintained within a preset range, when it is monitored that the torque of the servo motor increases or becomes more than a preset threshold; quickly fine-tuning and increasing the distance between the two ends of the linear saw and enable the torque of the servo motor to be restored to or maintained within the preset range, when it is monitored that the torque of the servo motor decreases or becomes smaller than a preset threshold.

According to another aspect of the present disclosure, a numerical control saw machine apparatus is provided, which includes: two carrying mechanisms, which are connected to two ends of a linear saw respectively; at least one control motor, configured for adjusting a distance between the two carrying mechanisms; and a pair of vibration motors, configured for driving the vibration of the linear saw, wherein, the distance between the two carrying mechanisms is adjusted by the control motor based on a monitored change in a torque of the control motor.

According to a further aspect of the present disclosure, a plate material is provided, which is machined by using the method described above or with the apparatus described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
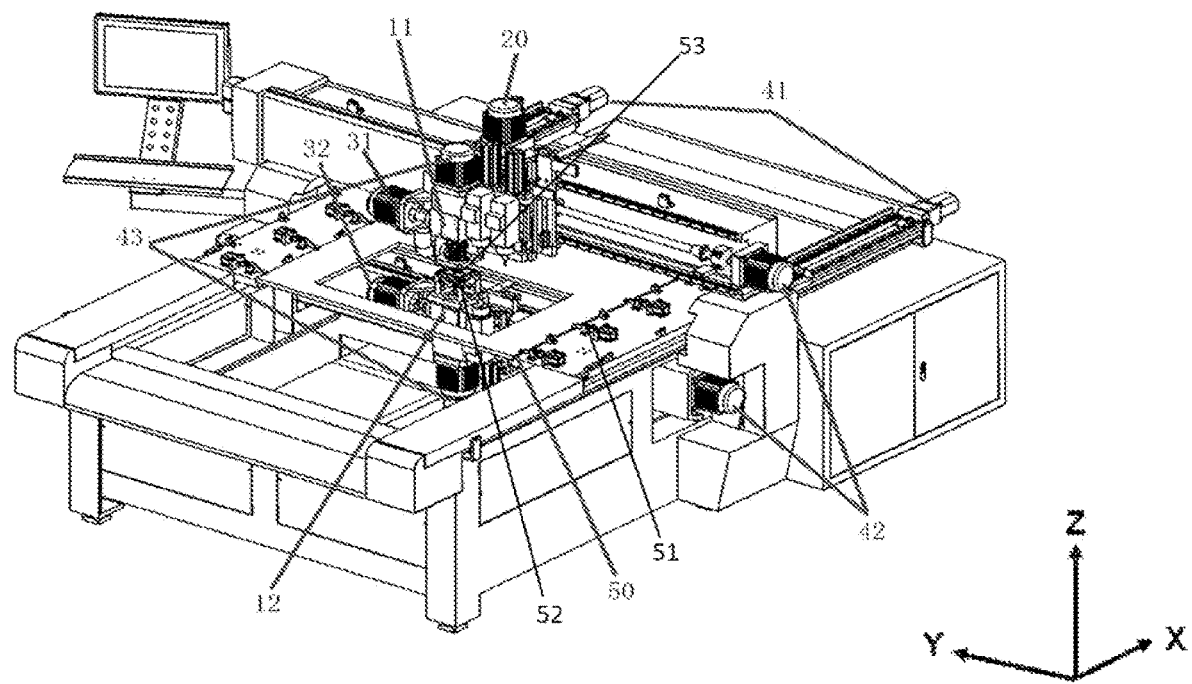
FIG. 1 schematically shows a numerical control saw machine apparatus according to an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meaning as understood by those ordinarily skilled in the art. In the specification and the claims of the present disclosure of patent application, words such as "first", "second" and the like do not denote any order, quantity, or importance, but rather are used for distinguishing different components. Similarly, words such as "one", "a/an" or "the" or the like do not denote quantitative limitation, but rather indicate at least one exists.

When a linear saw is configured for reciprocating cutting, an overall shape of the linear saw itself is generally thin and long, rigidity is insufficient in a transverse direction perpendicular to a linear direction of the linear saw (a direction perpendicular to an extending surface of a linear saw blade); only by applying a suitable tensile force to two ends of the linear saw to straighten and strain the linear saw, certain rigidity of the linear saw can be obtained in the transverse direction perpendicular to the linear direction of the linear saw, so that the linear saw can use linear saw teeth to cut a workpiece and perform reciprocating cutting in the transverse direction perpendicular to the linear direction of the linear saw; in this case, rigidity of the linear saw is mainly embodied in the linear direction, but in the transverse direction perpendicular to the linear direction of the linear saw, the linear saw is easily affected by external resistance and thus generates distortion such as bending and twisting; and distortion of the linear saw will cause the linear saw to deviate from a machining position in the transverse direction, which further affects positional accuracy and perpendicularity of a gap machined on the workpiece, and reduces machining precision and machining quality of the linear saw.

In order to resist influence of external resistance in the transverse direction of the linear saw and reduce distortion such as bending and twisting of the linear saw, a method for enhancing rigidity of the linear saw in the transverse direction can be adopted. Rigidity of the linear saw in the transverse direction is mainly related to factors below: (1) the better the material performance of the linear saw itself that is related to rigidity, the better the rigidity of the linear saw; (2) the larger the transverse size (the width) of the linear saw itself, the better the rigidity; and (3) the greater the tensile force experienced by the linear saw in the linear direction, the better the rigidity of the linear saw in the transverse direction during machining, and rigidity of the linear saw in the transverse direction is positively related to the tensile force in the linear direction of the linear saw.

Known linear saw materials are already common and mature, so material performance related to rigidity may not have a big leap enhance in a short term; as a linear machining tool, the linear saw itself may not have a large transverse size compared to a size in the linear direction, which is even more so especially when machining a gap with a large depth-to-width ratio; meanwhile, shape, size and material of the linear saw determine that tensile strength of the linear saw is limited, so the tensile force experienced by the linear saw in the linear direction should not be too large, and when the tensile force experienced by the linear saw in the linear direction reaches a maximum value of the tensile strength of the linear saw, the linear saw will be broken or split.

Meanwhile, during reciprocating cutting with the linear saw, due to reciprocating characteristics of machining, external resistance experienced by the linear saw fluctuates periodically; and the linear saw can only passively endure impacts of the external resistance that fluctuates periodically. Affected by the external resistance that fluctuates periodically, the linear saw will generate a yield phenomenon; and the greater the fluctuation of the external resistance, the more obvious the yield phenomenon generated by the linear saw, and the shorter the service life of the linear saw.

In addition, as the external resistance experienced by the linear saw fluctuates periodically, under an action of the external resistance, the tensile force in the linear direction on two ends of the linear saw has also been changing, which, thus, affects positional accuracy in the transverse direction during reciprocating machining with the linear saw, and further affects accuracy of various positions of the machined gap.

In some cases, during reciprocating cutting with the linear saw, positions of two ends of the linear saw are fastened by clamps at two ends, so that a distance between the two ends of the linear saw remains unchanged; during reciprocating cutting with the linear saw, under the action of the external resistance in the transverse direction of the linear saw, tension of the linear saw (equal to the tensile force in the linear direction on two ends of the linear saw) will increase, and when the tension of the linear saw exceeds the maximum value of the tensile strength of the linear saw itself, the linear saw will be broken or split.

Figure 4A:
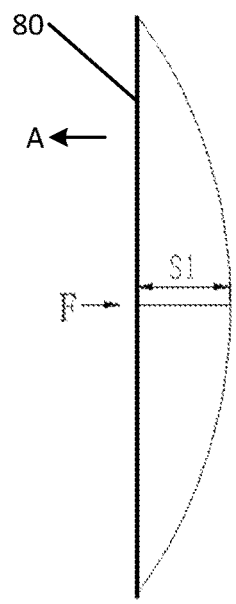
FIG. 4A and FIG. 4B schematically show distortion of a linear saw subjected to a force perpendicular to its linear extension direction from different perspectives.
Figure 4B:
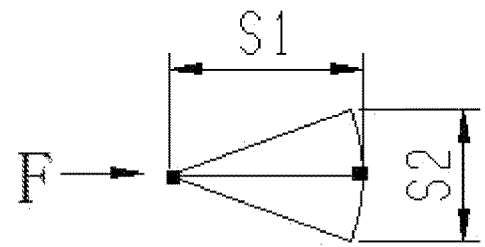

On the other hand, even if the linear saw is not split or broken, under the action of the external resistance experienced by the linear saw in the transverse direction of the linear saw, the linear saw will be elongated due to its own ductility, and at a same time, bent or twisted and distorted, which causes the linear saw to generate machining position deviation in the transverse direction, further affects positional accuracy and perpendicularity of the gap machined on the workpiece, and reduces machining precision and machining quality of the linear saw. For example, as shown in FIG. 4A and FIG. 4B, when subjected to transverse resistance (advance resistance) F during cutting, a linear saw 80 is distorted, and generates a backward position deviation S1 in an advancing direction A in the cutting process, meanwhile, the linear saw will also generate an irregular S-shaped position deviation S2 toward both sides of the extension direction of the linear saw under actions of the resistance F and other forces; and the position deviation S1 and the position deviation S2 lead to a position deviation of the cutter gap machined by cutting, and affect positional accuracy of the cutter gap.

In order to improve the above-described problems, in some cases, elastic elements or damping devices (e.g., oil cylinders, air cylinders, pull springs, pressure springs, etc.) can be used to implement a solution of controlling the tension of the linear saw. An advantage thereof is that a relatively constant tensile force can be provided to buffer periodic fluctuation amplitude of the tensile force, but disadvantages are also obvious, which are mainly: elastic components or damping devices such as oil cylinders, air cylinders, pull springs, pressure springs and other elements cannot actively adjust the tensile force at two ends of the linear saw, and it is not easy to actively adjust tensile force generated thereby during reciprocating motion of the linear saw, so adjustment is difficult, inaccurate and vague, let alone accurate real-time implementation of active real-time adjustment of the tensile force of the linear saw, so the periodic fluctuation amplitude of the tensile force can only be passively buffered within a certain range; in addition, due to high-speed reciprocating motion of the linear saw and vibrating components, as well as elasticity or damping performance of an elastic component or a damping device itself, such passive buffering also has hysteresis.

In a word, the periodic fluctuation amplitude of the tensile force can only be buffered in a passive and delayed manner within a relatively blurry range by using elastic elements or damping devices, so the periodic fluctuation amplitude of the tensile force is not well controlled by using the above-described solution of controlling tension of the linear saw by using elastic elements or damping devices (e.g., oil cylinders, air cylinders, pull springs, pressure springs, etc.); and the fluctuation amplitude is relatively large, so that the tensile force preloaded in order to straighten and strain the linear saw before machining with the linear saw should not be too large, otherwise, it is easy to exceed the maximum value of the tensile strength of the linear saw when adding on the fluctuation amplitude of the tensile force during machining. The preloaded tensile force of the linear saw is not large, while the fluctuation amplitude is large, which greatly affects cutting accuracy and machining quality of the linear saw, so that the cutting accuracy of the current linear saw has always been in a relatively low state and level.

Theoretically, the larger the tension of the linear saw, the better the rigidity of the linear saw in the transverse direction, and the higher the positional accuracy of the machined gap. However, when the tension of the linear saw exceeds the maximum value of the tensile strength of the linear saw itself, the linear saw will be broken or split, so the tension of the linear saw and the fluctuation amplitude of the tension of the linear saw need be both controlled within the maximum value of the tensile strength of the linear saw.

In a case where the material and the size of the linear saw are restrained, the machining apparatus and the machining method according to the embodiments of the present disclosure can increase the tensile force as much as possible in the linear direction of the linear saw with allowance; the tensile force is less than a maximum tensile force that makes the tensile strength of the linear saw reach the maximum value, and is made as close as possible to the maximum value of the tensile strength of the linear saw and maintains, so as to attain, enhance and maintain rigidity of the linear saw in the transverse direction, resist influence of the external resistance experienced by the linear saw in the transverse direction, reduce distortion such as bending and twisting generated by the linear saw, and improve machining accuracy and machining quality of the linear saw. Those skilled in the art can select a suitable tensile force allowance according to characteristics such as material and size of the linear saw used, and/or material and size of the workpiece, to enable the linear saw not be broken or split by the maximum external resistance in the transverse direction during machining the workpiece, while the tensile force is applied to the linear saw as much as possible to enable the linear saw to have sufficient rigidity in the transverse direction. For example, in some embodiments, a tensile force preset by a torque of a servo motor is less than 5% to 10% of a maximum tensile force that a linear saw can withstand; and of course, those skilled in the art can select a suitable tensile force allowance according to specific situations.

Specifically, through the novel numerical control saw machine apparatus and control solution, two ends of the linear saw are always tensioned in reverse directions by devices that fasten two ends of the linear saw, and the tension acting on the linear saw is maintained relatively stable as much as possible during machining with the linear saw, while the periodic fluctuation amplitude of tensile forces at two ends of the blade is reduced, and the tension is controlled within the maximum value of the tensile strength of the linear saw. Thus, transverse rigidity of the linear saw can be increased to resist the external resistance experienced by the linear saw in the transverse direction, reducing transverse bending or twisting and distortion of the linear saw. That is, the positional accuracy during transverse machining with the linear saw is relatively stabilized, and the positional accuracy and perpendicularity of gaps machined by means of reciprocating cutting with the linear saw, and the machining quality of the gaps are improved.

More specifically, during machining, an external force in the transverse direction experienced by the linear saw is constantly changing, and in order to maintain the tension on two ends of the linear saw as stable as possible, it is necessary to monitor and detect the tension on two ends of the linear saw, and quickly adjust a distance between the two ends of the linear saw according to monitoring and detection results, so as to achieve the purpose of maintaining the tension on two ends of the linear saw. The plate material machining apparatus and the machining method according to the embodiments of the present disclosure, monitors the tension on two ends of the linear saw by monitoring the torque of the servo motor; when subjected to resistance in the transverse direction during cutting with the linear saw, the linear saw generates distortion such as bending or twisting, so that the tensile force on two ends of the linear saw increases, resulting in increase in the tension on two ends of the linear saw, and the torque of the servo motor accordingly increases to balance the increased tension; after monitoring the increase in the torque of the servo motor, the numerical control saw machine control system quickly fine-tunes and reduces a relative position of carrying mechanisms at two ends of the linear saw to make the torque of the servo motor that controls the tensile force restore within a preset value range, so that a tension change of the linear saw is accurately stabilized within a small value range; vice versa, when the tensile force on two ends of the linear saw decreases, the torque of the servo motor that is required to maintain the positions of two ends of the linear saw becomes smaller; and after monitoring that the torque of the servo motor becomes smaller, the numerical control saw machine control system quickly fine-tunes and increases the relative position of the carrying mechanisms at two ends of the linear saw to make the torque of the servo motor that controls the tensile force restore within a preset value range, so as to accurately stabilize a tension change of the linear saw within a small value range. Because the fluctuation amplitude of the tensile force is small, the preloaded tensile force for machining with the linear saw can be set to be close to the maximum value of the tensile strength of the linear saw, and increase in the preloaded tensile force can greatly reduce bending or twisting and distortion generated by the linear saw during reciprocating cutting, which, thus, can enhance quality of reciprocating cutting with the linear saw, and greatly improve reciprocating cutting accuracy of the linear saw. There are also cases where the tensile force on two ends of the linear saw becomes smaller, for example, a space-keeping part of the linear saw passes through a machining groove, a portion where hardness of the workpiece becomes smaller is machined during machining, a machining position returns from a deviation position to a correct position during machining, and so on.

According to the embodiment of the present disclosure, before the numerical control sawing machine performs vibration reciprocating machining with the linear saw, the linear saw is stretched by a control motor controlling movement of a relative position of two ends of the linear saw, and the motor torque reaches a preset value, so that the tension on the linear saw along the extension direction of the linear saw is equal to the preset tensile force; in this case, the control motor stays relatively fixed along the extension direction of the linear saw, and the linear saw begins to vibrate along the extension direction of the linear saw in a reciprocating manner and starts sawing. When the numerical control saw machine performs vibration machining with the linear saw, a frictional resistance is generated between the linear saw and the machined material, and the frictional resistance will cause the linear saw to generate a greater tension that acts on the control motor, so the torque of the control motor will increase to balance the tension of the linear saw; and the torque of the control motor in this case is monitored: if the torque of the control motor becomes larger, the positions of the carrying mechanisms at two ends of the linear saw is fine-tuned to shorten the relative distance between the two ends of the linear saw that are clamped by the carrying mechanisms along the extension direction of the linear saw, so that the torque of the control motor is restored to the preset value range. When the numerical control saw machine performs vibration machining with the linear saw, if the tensile force of the linear saw that acts on the control motor becomes smaller, and the position of the control motor along the extension direction of the linear saw stays relatively fixed, the torque of the control motor will decrease to balance the tension of the linear saw; and the torque of the control motor in this case is monitored: if the torque of the control motor becomes smaller, the positions of the carrying mechanisms at two ends of the linear saw is fine-tuned to increase the relative distance between the two ends of the linear saw, so that the torque of the control motor is restored to the preset value range.

Figure 2:
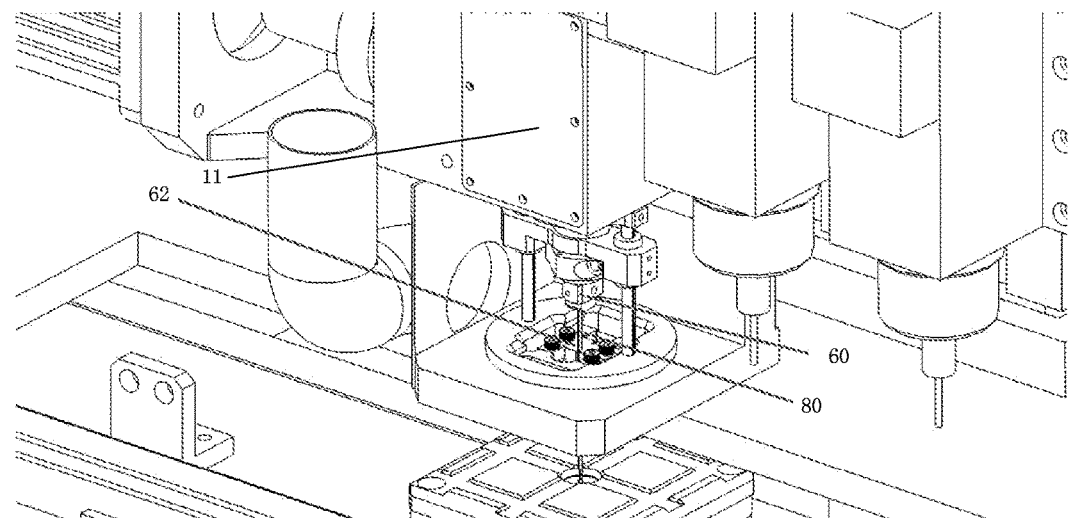
FIG. 2 is a partially enlarged view of FIG. 1.

FIG. 1 shows a numerical control saw machine apparatus according to an embodiment of the present disclosure; FIG. 2 is a partially enlarged view of FIG. 1, wherein, a clamping tool head 60 for clamping one end of a linear saw 80 and a carrying mechanism 11 for mounting the clamping tool head 60 of the numerical control saw machine shown in FIG. 1 can be more clearly seen from FIG. 2.

As shown in FIG. 1, the numerical control saw machine apparatus comprises: two carrying mechanisms 11 and 12, a control motor 20 for adjusting a relative distance between the carrying mechanisms 11 and 12, and a pair of vibration motors 31 and 32 for driving the linear saw to vibrate in its extension direction.

A clamping tool head is fixedly mounted on each carrying mechanism, and the clamping tool heads of the two carrying mechanisms 11 and 12 fixedly clamp two ends of the linear saw 80 respectively. The numerical control saw machine apparatus according to the embodiment of the present disclosure can automatically clamp end portions of the linear saw by the clamping tool heads. On one hand, the clamping tool heads can move with the movements of the carrying mechanism to predetermined positions in the extension direction of the linear saw, and then move in the extension direction of the linear saw to connect and fasten the end portions of the linear saw; on the other hand, the clamping tool head can have a clamping structure to connect and fasten the end portion of the linear saw in a clamping manner, so that the end portion of the linear saw will not change any position relative to the clamping tool head even if a large tensile force is applied to the end portion. According to the solution of the embodiment of the present disclosure, the connection and fastening mode may not be limited to clamping, and can also be locking in an aligned and clamped manner. The control motor 20 is firstly configured for providing tensile forces for two ends of the linear saw 80 by the two carrying mechanisms 11 and 12. After the respective clamping tool heads 60 of the carrying mechanisms 11 and 12 respectively clamp and fasten two ends of the linear saw 80 (upper and lower ends in FIG. 1 and FIG. 3), the control motor 20 outputs a torque so as to apply tensile forces (i.e., a tensions) to the end portions of the linear saw 80. The tensile forces F0 can be a predetermined value, which, for example, is close to but less than a maximum value of tensile strength Fmax of the linear saw. When the control motor 20 outputs the torque so that the tensions on two ends of the linear saw 80 are F0, a distance between two end points of the linear saw that are clamped by the clamping tool heads can be recorded as L0 as an initial length. Because positions of the end portions of the linear saw at which are clamped by the clamping tool heads may not be the most far-end positions of the linear saw, the initial length can be different from the maximum physical length of the linear saw; however, the initial length can include tensile distortion of the linear saw caused by the tensile force F0 applied (although such tensile distortion can be small).

When a workpiece is machined with the linear saw, due to acting forces such as frictional force between the workpiece and the linear saw, as previously analyzed, the linear saw is subjected to forces in its transverse direction (perpendicular to the linear extension direction), so that the tensile forces on two ends of the linear saw increase, and the tensile forces of the linear saw on the two clamping tool heads also increase; a tensile force change amount is recorded as ΔF, then a current value of the tensile force (or the tension) is F0+ΔF (only magnitude of the force is analyzed here); as the tensile force increases, the torque of the control motor 20 in balance with it also increases; and a control system of the numerical control saw machine apparatus monitors a torque change and controls the torque change within a certain range, thereby making the tensile force change amount ΔF<Fmax−F0.

The control system of the numerical control saw machine apparatus can adjust and control the torque of the control motor 20 in real time, that is, control the torque of the control motor as the apparatus starts and adjust it as needed; or it can be conditionally triggered. For example, the torque monitoring starts only when a torque change is detected, for a specific example, the torque can be adjusted as needed when it is detected that the torque change amount exceeds a certain threshold. That is, if the torque change is relatively small and does not reach a preset threshold, the apparatus control system continues to monitor the torque, but does not start torque adjustment. The apparatus control system monitors the torque of the control motor 20 at small time intervals. The distance between the two ends of the linear saw can be reduced or increased by fine-tuning at a rate in microseconds or milliseconds. For example, the distance between the two ends of the linear saw is adjusted in milliseconds (ms), while the torque of the control motor 20 is monitored and fed back in microseconds (μs) at most.

The clamping tool head 60 of the carrying mechanism 11 and the clamping tool head 60 of the carrying mechanism 12 are fixedly connected to the two ends of the linear saw 80, respectively. The relative distance (position) between the carrying mechanisms 11 and 12 can be adjust in the extension direction of the linear saw under an action of the control motor 20; the relative distance (position) between the clamping tool heads 60 thereof in the extension direction of the linear saw is adjusted; and the distance between the two ends of the linear saw 80 is adjusted.

The vibration motor 31 and the vibration motor 32 respectively provided on the carrying mechanism 11 and the carrying mechanism 12 make the clamping tool head of the carrying mechanism 11 and the clamping tool head of the carrying mechanism 12 to vibrate synchronously. Specifically, the vibration motor 31 and the vibration motor 32 drive the clamping tool head 60 of the carrying mechanism 11 and the clamping tool head 60 of the carrying mechanism 12 respectively, so that the carrying mechanism 11 and the carrying mechanism 12 each vibrate within a set vibration stroke, and the vibrations are synchronized with a same vibration amplitude. For example, the vibration motor 31 and the vibration motor 32 each have an eccentric shaft structure to implement the above-described vibrations.

During machining with the linear saw, the control motor 20 adjusts and controls the distance between the carrying mechanisms 11 and 12, thereby changing the length of the linear saw 80 between the two clamping ends; because the vibration motor 31 and the vibration motor 32 are fastened at the carrying mechanism 11 and the carrying mechanism 12 respectively, the distance between the vibration motor 31 and the vibration motor 32 also changes with the distance between the carrying mechanism 11 and the carrying mechanism 12. In this way, the distance between the force application points at which the vibration motor 31 and the vibration motor 32 respectively acting on the clamping tool heads 60 is also adjusted with corresponding fine-tuning of the distance between the carrying mechanism 11 and the carrying mechanism 12. That is, a slight change in the distance between the two ends of the linear saw 80 is synchronized with a change in the distance between the vibration motor 31 and the vibration motor 32. Thus, the two ends of the linear saw 80 can be ensured to vibrate synchronously, with synchronous vibrations of the vibration motor 31 and the vibration motor 32 unchanged.

In a specific solution according to the embodiment of the present disclosure, for example, with respect to machining on a cutting die plate with a thickness of 18 mm, the vibration motor has a vibration frequency of about 2,800 times per minute, and a stroke of about 20 mm; a fine-tuning range of the distance between the carrying mechanisms by the control motor is 0.01 mm to 0.02 mm; and a rate of adjusting the distance between the carrying mechanisms by the control motor is faster than a vibration rate of the vibration motor. Therefore, an amount of change in the distance between the carrying mechanisms by adjustment is equal to an amount of change in the distance between the vibration motors by adjustment (also equal to an amount of change in the distance between the two ends of the linear saw by adjustment), which is negligible compared to a vibration stroke of the linear saw; in addition, the rate of adjusting by such a change amount is also faster than a vibration frequency of the linear saw. Thus, adjusting the positions of the carrying mechanisms by the control motor may basically not affect synchronous vibration of the vibration motor; and therefore, it is not necessary to additionally adjust and control the vibration motor for the change in the distance between the carrying mechanisms.

Based on the above-described apparatus structure, it can be implemented that: (1) the two carrying mechanisms can be independent of each other; (2) by controlling the distance between the two carrying mechanisms, rigid connection between the two carrying mechanisms can be implemented through the linear saw, or say, rigidity of the linear saw in the transverse direction can be maintained; and (3) the two clamping tool heads of the two carrying mechanisms vibrate synchronously during machining with the linear saw.

As described above, when the numerical control saw machine performs vibration machining, the relative distance between the two carrying mechanisms does not always remain at a fixed value, but changes dynamically. During machining, the linear saw is subjected to a frictional resistance and thus has the tensile force changed; the numerical control saw machine apparatus monitors the torque of the control motor, and dynamically adjusts the relative positions of the carrying mechanism at the control motor end and the far-end carrying mechanism through the control motor to dynamically adjust the tension of the linear saw and maintain the tension within a certain range. Because the relative distance between the two carrying mechanisms changes dynamically when the numerical control saw machine performs vibration machining, the two carrying mechanisms are independent of each other.

When the numerical control saw machine does not perform vibration machining, the two carrying mechanisms also operate independently. The clamping tool head of the carrying mechanism that is configured for fastening the linear saw has functions of automatically clamping and fastening the linear saw, and automatically releasing the linear saw. When releasing the linear saw, the clamping tool head at the far end of the control motor releases the corresponding end of the linear saw, and the control motor drives its near-end carrying mechanism along with the linear saw fastened by the clamping tool head of the carrying mechanism, to move away from the carrying mechanism of the corresponding end that has released the linear saw (move reversely), relative to the other carrying mechanism along the linear extension direction of the linear saw, so that the linear saw withdraws from a machining groove on the workpiece or leaves the workpiece, and then enters an initial position for next machining or an initial preparation position. When fastening the linear saw, the control motor drives its near-end carrying mechanism, together with the linear saw fastened by the clamping tool head of the carrying mechanism, to move close to the carrying mechanism that clamps the linear saw (moves reversely) relative to the other carrying mechanism along the linear extension direction of the linear saw, and feed the linear saw to a linear saw fastening position of the clamping tool head of the far-end carrying mechanism (the linear saw straddles the thickness of the plate material at an edge of the plate material to be machined or passes through a reserved machining hole or machining groove on the plate material to be machined, so as to reach a predetermined machining position); then the clamping tool head of the far-end carrying mechanism automatically clamps and fastens one end of the linear saw, and the control motor adjusts the relative positions of the two carrying mechanisms, usually increases the distance between the two carrying mechanisms slightly to set the tension on two ends of the linear saw, so that, as described above, the tension is close to the maximum value of the tensile strength of the linear saw. Next, the linear saw can be controlled to cut the plate material to be machined through synchronous vibration of the vibration motors and real-time adjustment by the control motor.

By controlling the distance between the two carrying mechanisms, the linear saw can be used to implement rigid connection between the two carrying mechanisms, or in other words, maintain rigidity of the linear saw in the transverse direction. The clamping tool heads provided at the two carrying mechanisms are rigidly fastened to respectively clamp and fasten two ends of the linear saw, to provide a tension that strains the linear saw, which balances with the tensile forces of the linear saw on the clamping tool heads; the tensile forces of the linear saw on the clamping tool heads are rigidly transmitted to the carrying mechanism, so that a rigid connection is formed between the two carrying mechanisms. By adjusting the distance between the two carrying mechanisms through the control motor, rigidity of the linear saw in a direction perpendicular to its linear extension direction (transverse direction) can be maintained.

As compared with the solution of applying the tensile forces to the linear saw through damping or elastic elements such as oil cylinders, air cylinders, pressure springs and elastic springs, the distance between the two carrying mechanisms is controlled to maintain rigidity of the linear saw in the transverse direction during machining, which can greatly reduce bending distortion generated by the linear saw during sawing, reduce positional accuracy deviation of machining, and improve sawing process quality of the linear saw of the numerical control saw machine. In addition, the distance between the two ends of the linear saw can be adjusted to maintain the tension of the linear saw within a relatively small range that is slightly lower than the maximum value of the tensile strength of the linear saw, which, thus, can reduce breakage and damage of the linear saw due to an excessively large tension, and guarantee a smooth sawing process of the linear saw of the numerical control saw machine.

When the numerical control saw machine performs vibration machining, the clamping tool heads of the two carrying mechanisms vibrate in the extension direction of the linear saw or in a direction parallel to the extension direction, and the distance between the two clamping tool heads can be only subjected to minor adjustment (relative to a vibration amplitude), so vibrations of the two clamping tool heads are still synchronized. That is, during vibration, the two clamping tool heads have a same vibration frequency, a same vibration amplitude, a same vibration start time, and a same vibration stop time. Therefore, vibrations of the two ends of the linear saw 80 as driven by the two clamping tool heads which are rigidly connected are also synchronized. That is, the two ends of the linear saw 80 vibrate synchronously as driven by the two clamping tool heads, with a same vibration frequency, a same vibration amplitude, a same vibration start time, and a same vibration stop time during vibration. The two vibration motors 31 and 32 configured for respectively driving the two clamping tool heads to vibrate can be fixedly mounted on the carrying mechanisms 11 and 12 respectively, according to the solution shown in FIG. 1; or, the two vibration motors 31 and 32 may not be fixedly mounted on their respective corresponding carrying mechanisms, but offset influence of adjusting the distance between the two carrying mechanisms 11 and 12 on vibration by controlling the vibration motors.

As shown in FIG. 1, the numerical control saw machine apparatus can also be provided with a machining platform 50 for fastening the workpiece, so that the two carrying mechanisms 11 and 12 and their respective clamping tool heads are distributed oppositely on upper and lower sides of the workpiece. In addition, the numerical control saw machine apparatus can also be provided with a transverse motor 41 for driving the linear saw to move transversely along an X-axis direction and a longitudinal motor 42 for driving the linear saw to move longitudinally along a Y-axis direction, as well as a rotary motor 43 for driving the linear saw to rotate along the linear extension direction of the linear saw.

The X-axis direction and the Y-axis direction here are reference frames in a plane perpendicular to the extension direction of the linear saw, so the transverse motor 41 and the longitudinal motor 42 are configured for controlling movement of the linear saw in the plane; Because the two ends of the linear saw are fixedly connected to the two carrying mechanisms, it is actually that the transverse motor and the longitudinal motor drive the carrying mechanisms to move.

For example, when the numerical control saw machine performs vibration machining, beams (not shown) respectively loaded with the two carrying mechanisms 11 and 12 can slide along their respective tracks as driven by the transverse motor 41, so that the two fastened clamping tool heads and the linear saw 80 can be driven to move synchronously and transversely along the X axis; and the longitudinal motor 42 can drive the corresponding carrying mechanisms to slide on beams where they are located, so that the two fastened clamping tool heads and the linear saw 80 can be driven to move synchronously and longitudinally along the Y axis. With respect to a case where the linear saw 80 is a saw blade, the X-axis direction can be a direction in which the saw teeth extend. Thus, forward and backward movements of the linear saw along the X-axis direction can correspond to forward and backward movements of the saw teeth in a machining direction in the machining groove of the workpiece.

Considering synchronous movement of the upper and lower beams as well as a relatively large total weight of the beams together with the carrying mechanisms, the vibration motors, the control motor, etc. mounted thereon, two pairs of transverse motors can be provided to respectively drive the upper beam and the lower beam to implement synchronous movement of the upper beam and the lower beam; the solution shown in FIG. 1 can also be used, in which a pair of (two) transverse motors are used to drive the machining platform 50 to move along a sliding track in the X-axis direction, so that the upper beam and the lower beam can synchronously move in the X-axis direction relative to the workpiece (e.g., the plate material) fastened on the machining platform 50.

In an embodiment, longitudinal motors 42 are provided at one end or two ends of the upper beam and the lower beam, for correspondingly driving the carrying mechanisms loaded on the beams, together with the control motor, the clamping tool heads, the vibration motors, etc., that are fixed mounted on the carrying mechanisms to slide on the sliding tracks provided on the beams, and the carrying mechanisms of the upper beam and the lower beam move synchronously, which, thus, makes the linear saw move in the Y-axis direction. In other words, one carrying mechanism is driven to move in the Y-axis direction by using one longitudinal motor or a pair of longitudinal motors.

Two rotary motors 43 are respectively provided on the two carrying mechanisms 11 and 12, and each rotary motor drives a clamping tool head to rotate about a rotation axis of the linear saw, so as to drive two ends of the linear saw 80 to rotate synchronously about the rotation axis of the linear saw. For example, with respect to a case where the linear saw 80 is a saw blade, the rotation axis of the linear saw can be a central axis of a maximum width thereof, so as to facilitate rotary cutting at a turning corner of the machining groove; for another example, with respect to a case where the linear saw 80 is a wire saw, the rotation axis of the linear saw is a center line thereof, and the rotary motor can also be configured for driving rotary cutting of the linear saw 80.

The numerical control saw machine according to the embodiment of the present disclosure, optionally, can be provided with two control motors 20 at the carrying mechanism 11 and the carrying mechanism 12 respectively; that is, the two control motors 20 are oppositely provided on both sides of the machining platform 50. Two control motors 20 are used so that each of the two carrying mechanisms 11 and 12 can actively move close to or away from the other in the linear extension direction of the linear saw or in the direction parallel to the linear extension direction of the linear saw. The adjustment can be faster, the movement space can be larger, and the adjustment of the distance between the carrying mechanisms can be more precise through differential control of the two control motors.

The numerical control saw machine according to the embodiment of the present disclosure, optionally, can further be provided with a plurality of other tool heads near the clamping tool heads of the carrying mechanisms, to assist or replace the linear saw for machining; and such replacement can be controlled by the control system of the numerical control saw machine or can also be operated manually. These tool heads can be any cutters among drill cutters, milling cutter, punch cutters, grinding cutters, circular saw cutters, and drawing tools, which perform corresponding machining operations. For example, when machining a cutting die plate, three tool heads are provided in each carrying mechanism, as shown in FIG. 1. The carrying mechanism is moved by the motor to adjust positions of these tool heads relative to the workpiece; and these tool heads can be driven to work by the above-described respective motors or other servo motors. The numerical control saw machine can adjust movement positions and angles of the tool heads according to a numerical control signal, so as to adjust a machining angle.

The numerical control saw machine according to the embodiment of the present disclosure, in an example, can further comprise a linear saw limiting device 62, as shown in FIG. 2. When the numerical control saw machine performs linear saw vibration machining, if it is necessary to start machining from the middle of the workpiece, it is necessary to drill in the middle of the workpiece in advance, and then pass the linear saw through the drilled position. Because the structure of the linear saw is thin and long, a linear saw limiting device can be provided to assist the linear saw to pass through the drilled position. The linear saw limiting device 62 can be a component having a slit structure, and a width of the slit can be slightly larger than the thickness of the linear saw (especially in a case where the linear saw is a saw blade). In this way, a corresponding portion of the linear saw can be assisted to pass through the hole position through a limiting of the slit structure, so that the suspended end of the linear saw reaches the carrying mechanism on the other side and be fixedly connected by the clamping tool head.

On the other hand, when the linear saw performs vibration machining, regardless of whether or not machining starts from the middle of the workpiece, the limiting device can limit the position of the linear saw when the linear saw performs reciprocating vibration machining, which, thus, can strengthen transverse rigidity of the linear saw, restrict deviation of the machining position of the linear saw, and further improve positional accuracy of cutter gap cut by the linear saw.

When the linear saw performs vibration machining, a large amount of workpiece debris will be generated, so a dust suction device 61 can be provided at the machining position or near the machining position; a suction port of the dust suction device 61 is basically pressed close to the workpiece and the machining platform during machining, and almost covers the entire machining position; and then a suction pump and a suction tube are used to absorb and collect the debris generated during machining, so as to keep machining environment clean and tidy. The dust suction device 61 can also be provided on both sides of the machining platform 50 as needed, to more thoroughly absorb and collect the debris of the workpiece. The dust suction device 61 can also move synchronously with the machining position. A plurality of dust suction devices can also be provided.

Modes in which the machining platform 50 fastens the workpiece (e.g., the plate material to be machined) are different according to workpieces and machining requirements. With respect to machining of the cutting die plate, for example, as shown in FIG. 1, a supporting rod (not shown) is used to fixedly support the workpiece (not shown) from an edge of the machining platform 50 at one side, and a locking tool 51 is used to press the workpiece onto a pressing rod (not shown); a supporting platform 52 supports the workpiece near the machining position; a pressing platform 53 is used to press the workpiece from another side of the machining platform, and the pressing platform 53 is used to press the workpiece near the machining position; when the numerical control sawing machine performs machining, the pressing platform 53 and the supporting platform 52 fasten the workpiece, and the machining platform 50 can move with the machining tool such as the linear saw or move relative to the machining tool, for example, move synchronously along the X axis or the Y axis.

According to needs, the supporting platform 52 can also be used to fixedly support the workpiece from one side of the machining platform 50; the supporting rod fixedly press the workpiece from the other side of the workpiece; the locking tool 51 for fastening a material props up the workpiece from above the pressing rod and the machining platform 50, the supporting platform 52 supports the workpiece near the machining position; the pressing platform 53 is used to press the workpiece from the other side of the machining platform 50, and the pressing platform 53 presses the workpiece near the machining position.

According to needs, a special horizontal supporting board (not shown) can also be provided; the horizontal supporting board is used to fixedly clamp the workpiece; the supporting board and the workpiece are fastened on the machining platform 50 together; the flat feature of the supporting board makes the workpiece placed thereon more flat, which facilitates the numerical control sawing machine to perform more demanding machining such as drilling, milling, punching, grinding and drawing, in addition to sawing on the workpiece, and also makes the numerical control sawing machine applicable to machining of some soft materials, for example, drawing on cutting die paper (drawing paper), fabricating a bottom mold of a cutting die plate, and so on.

Figure 3:
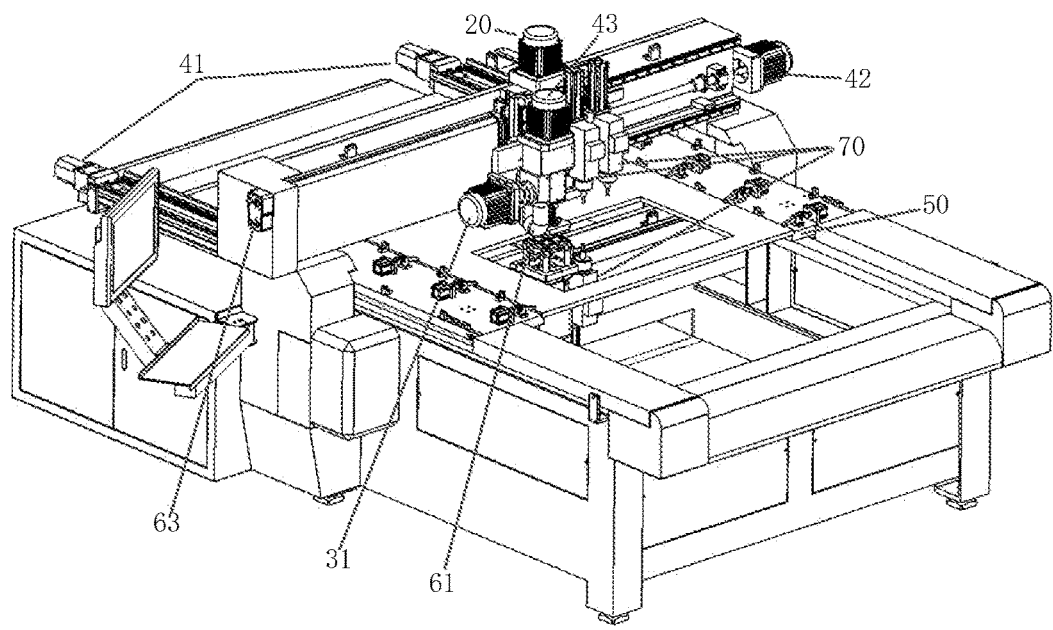
FIG. 3 shows a portion of the numerical control saw machine apparatus shown in FIG. 1 from a different perspective.

The numerical control saw machine according to the embodiment of the present disclosure, optionally, can further comprise a handwheel device 63; as shown in FIG. 3, the handwheel device 63 is used to assist an operator to manually operate the numerical control saw machine, so as to adjust positions of the respective machining tools and machining details while facilitating observation.

In the numerical control saw machine according to the embodiment of the present disclosure, the saw used can be a linear saw (a saw blade, a wire saw), a jig saw, or the like. Wherein, the linear saw can be a linear saw disclosed in the PCT international application (International Publication No. WO2016062249A1) submitted by the applicant, the linear saw comprises: a machining part, for cutting a workpiece in a linearly extending direction of the linear saw and generating a machining groove on the workpiece; and a space-keeping part configured such that the whole linear saw does not contact the machining groove or is not subject to an acting force of the machining groove when the space-keeping part passes through the machining groove. More specifically, a length of the space-keeping part is greater than a thickness of the workpiece, a width of the space-keeping part is less than a maximum width of the machining part, and a thickness of the space-keeping part is less than a maximum machining width of the machining part; or, a maximum machining width of the machining part is equal to a thickness of saw teeth of the machining part or a maximum thickness of path-opened saw teeth of the machining part; or, a difference between a maximum machining width of the machining part and a thickness of the space-keeping part is greater than a bending offset which is produced by the linear saw in a thickness direction of the space-keeping part before the space-keeping part passes through the workpiece.

In addition, size parameters of the space-keeping part can be designed and adjusted according to machining needs, for example, during machining of the cutting die plate, in a case where the thickness of the cutting die plate is 18 mm, and the width of the machining groove is 0.71 mm, a length of the space-keeping part of the linear saw is 16 mm to 27 mm, a preferred length is 24 mm to 26 mm, and such a choice can result in better comprehensive machining efficiency and effect.

Hereinafter, a machining method for machining a workpiece by using the numerical control sawing machine according to the embodiment of the present disclosure will be described with machining of a cutting die plate as an example. In addition to reciprocating cutting with a linear saw, main processes of cutting die plate machining usually can further comprise:

(1) Starting machining a cutter gap from the middle of the cutting die plate: which needs drilling a hole on the cutting die plate and passing the linear saw through the drilled hole;

(2) Machining a bridge position of the cutting die plate: which needs drilling a hole on the cutting die plate many times, and passing the linear saw through the drilled positions many times;

(3) Machining a half-bridge position of the cutting die plate: which needs milling on the cutting die plate with a milling cutter;

(4) Carving and milling on both sides of the cutting die plate: which needs carving and milling from both sides of the cutting die plate; and (5) Writing on the cutting die plate: which needs writing on the cutting die plate so as to record related information of the cutting die plate.

To achieve one or more of the above-described processes, a machining method below can be used:

In the machining method, an adopted tool combination includes: a linear saw (or a jig saw)+auxiliary tools (a drill cutter/a milling cutter/a punch cutter, a grinding cutter, and a pen head).

1. The workpiece for cutting die plate machining is a plate material, and the workpiece is placed on the machining platform of the numerical control saw machine.

2. According to a size of the workpiece, the supporting rod of the machining platform is moved; the supporting rod fixedly supports the workpiece from the periphery or the edge of the workpiece, and the locking tool above the supporting rod and the machining platform locks, fixes and press the workpiece from the periphery or the edge of the workpiece; the supporting platform supports the workpiece near the machining position; the pressing platform is used to press the workpiece from the other side of the machining platform, and the pressing platform presses the workpiece near the machining position; when the numerical control saw machine performs machining, the pressing platform and the supporting platform can move synchronously with the machining tool.

3. The drill cutter/the milling cutter/the punch cutter of the numerical control saw machine machines out a required drilling hole at a position where the cutting die plate needs to be machined, to facilitate the linear saw to pass through the cutting die plate.

4. The clamping tool head of the carrying mechanism located on one side fastens one end of the linear saw and drives the linear saw to move to the drilled position; and the movable linear saw limiting device clamps the other end of the linear saw and synchronously moves to the drilled position, which thus, can ensure the other end of the linear saw to be accurately aligned with the drilled position even if the linear saw is distorted before due to influence of the external force, and assist the linear saw to accurately pass through the hole position; due to an assisting role of the linear saw limiting device, after the other end of the linear saw passes through the hole position, distortion of the linear saw can also be corrected, which is favorable for the locking device on the clamping tool head of the carrying mechanism on the other side to quickly and accurately lock the other end of the linear saw.

5. After locking and fastening the linear saw, the numerical control saw machine adjusts the positions of the carrying mechanisms through the control motor to stretch the linear saw; the torque of the control motor reaches a preset value, so that the tension of the linear saw along the linear extension direction of the linear saw is equal to a preset tensile force value, the tensile force value makes the linear saw have a certain degree of tensile strength without breaking the linear saw; in this case, the control motor stays relatively fixed along a Z-axis direction, and the linear saw begins to vibrate along the linear extension direction of the linear saw in a reciprocating manner and starts sawing.

6. When the numerical control saw machine performs linear saw vibration machining, a frictional resistance is generated between the linear saw and the machined material, and the frictional resistance will cause the linear saw to generate a greater tension that acts on the control motor; because the position of the control motor along the linear extension direction of the linear saw stays relatively fixed, the torque of the control motor will increase to balance the tension of the linear saw; and the torque of the control motor in this case is monitored: if the torque of the control motor becomes larger, the position between the carrying mechanisms at two ends of the linear saw is fine-tuned by the control motor to shorten the relative distance between the carrying mechanisms at two ends of the linear saw along the linear extension direction of the linear saw, so that the torque of the control motor is restored to the preset value range.

7. When the numerical control saw machine performs linear saw vibration machining, if the tensile force of the linear saw that acts on the control motor becomes smaller, because the position of the control motor along the linear extension direction of the linear saw stays relatively fixed, the torque of the control motor will decrease to balance the tension of the linear saw; and the torque of the control motor in this case is monitored: if the torque of the control motor becomes smaller, the position between the carrying mechanisms at two ends of the linear saw is fine-tuned to increase the relative distance between the carrying mechanisms at two ends of the linear saw along the linear extension direction of the linear saw, so that the torque of the control motor is restored to the preset value range.

8. After machining a section of cutter gap of the cutting die plate is finished, the clamping tool heads of the two carrying mechanisms stop vibration synchronously; monitoring of change in the torque of the control motor and adjustment of positions of the carrying mechanisms by the control motor can be suspended; a locking device of one clamping tool head of one carrying mechanism quickly releases one end of the linear saw; and as driven by the control motor, the clamping tool head drives the linear saw to withdraw from the machining position of the cutting die plate from an ending position of the cutter gap, so that machining of a section of cutter gap of the cutting die plate is ended.

9. When the linear saw withdraws from the machining position of the cutting die plate, the clamping tool head of the other carrying mechanism fixedly clamps one end of the linear saw, and the linear saw limiting device supports the other end of the linear saw. The clamping tool head drives the linear saw, and moves with the linear saw limiting device and the other end of the linear saw; after passing the bridge position, the linear saw reaches a start machining position of another section of cutter gap of the cutting die plate, preparing to start machining of another section of cutter gap of the cutting die plate.

10. After finishing machining of all the cutter gaps to be machined on the cutting die plate, the numerical control saw machine performs auxiliary machining on the cutting die plate as needed, for example: selectively performs half-bridge milling as needed with a milling cutter in other tool heads 70, to mill out a required half-bridge cutter gap at the bridge position; selectively carve and mill the cutting die plate as needed with a milling cutter in the tool heads 70, wherein, carving and milling can be respectively carried out from both sides of the cutting die plate; or, selectively writes on the cutting die plate as needed with a pen head in the tool heads 70 so as to record related information of the cutting die plate.

11. The milling cutter in the tool heads 70 is used to cut the desired cutting die plate from the material. So far, machining of the cutting die plate with the numerical control saw machine is completed.

The milling cutters in the above-described steps can be a same milling cutter or different milling cutters. For example, a milling cutter for milling a half-bridge position can be different from a milling cutter for carving and milling a cutting die plate or a milling cutter for cutting a desired cutting die plate from a material. For example, when a half-bridge position is being milled, a gap width of the half-bridge position is 0.71 mm, so a milling cutter needs to have a diameter suitable for machining a specification of 0.71 mm; however, such a milling cutter has relatively low efficiency in carving and milling with a large cutting amount or cutting a machined cutting die plate from a whole piece of wooden plate, so it can be replaced with other milling cutter of a larger specification.

The content and order of the respective steps in the above-described machining method can be selected and adjusted according to actual machining needs.

A machining method below can also be used:

An adopted tool combination includes: a linear saw (a jig saw)+a circular saw (a straight-line saw)+auxiliary tools (a drill cutter/a milling cutter/a punch cutter, a grinding cutter, and a pen head).

1. The workpiece for cutting die plate machining is a plate material, and the workpiece is placed on the machining platform of the numerical control saw machine.

2. According to a size of the workpiece, the supporting rod of the machining platform is moved, the supporting rod fixedly supports the workpiece from the periphery or the edge of the workpiece, and the locking tool on the supporting rod and the machining platform locks, fixes and presses the workpiece from the periphery or the edge of the workpiece; the supporting platform supports the workpiece near the machining position; the pressing platform is used to press the workpiece from the other side of the machining platform, and the pressing platform presses the workpiece near the machining position; when the numerical control saw machine performs vibration machining, the pressing platform and the supporting platform can move synchronously with the machining tool.

3. The drill cutter/the milling cutter/the punch cutter of the numerical control saw machine machines out a required drilling hole at a position where the cutting die plate needs to be machined, to facilitate the linear saw to pass through the cutting die plate.

4. The clamping tool head fastens one end of the linear saw and drives the linear saw to move to the drilled position; and the movable linear saw limiting device clamps the other end of the linear saw and synchronously moves to the drilled position, which thus, can ensure the other end of the linear saw to be accurately aligned with the drilled position even if the linear saw is distorted before due to influence of the external force, and assist the linear saw to accurately pass through the hole position; due to an assisting role of the linear saw limiting device, after the other end of the linear saw passes through the hole position, distortion of the linear saw can also be corrected, which is favorable for the locking device on the clamping tool head on the other end to quickly and accurately lock the other end of the linear saw.

5. After locking and fastening the linear saw, the numerical control saw machine adjusts the position of the carrying mechanism through the control motor to stretch the linear saw; the torque of the control motor reaches a preset value, so that the tension of the linear saw along the linear extension direction of the linear saw is equal to a preset tensile force value, the tensile force value makes the linear saw have a certain degree of tensile strength without breaking the linear saw; in this case, the control motor stays relatively fixed along the linear extension direction of the linear saw, and the linear saw begins to vibrate along the linear extension direction of the linear saw in a reciprocating manner and starts sawing. Firstly, the numerical control saw machine is used to machine out all curved, arc and short-line cutter gaps.

6. When the numerical control saw machine performs linear saw vibration machining, a frictional resistance is generated between the linear saw and the machined material, and the frictional resistance will cause the linear saw to generate a greater tension that acts on the control motor; because the position of the control motor along the linear extension direction of the linear saw stays relatively fixed, the torque of the control motor will increase to balance the tension of the linear saw; and the torque of the control motor in this case is monitored: if the torque of the control motor becomes larger, the positions of the carrying mechanisms at two ends of the linear saw is fine-tuned to shorten the relative distance between the carrying mechanisms at two ends of the linear saw along the linear extension direction of the linear saw, so that the torque of the control motor is restored to the preset value range.

7. When the numerical control saw machine performs linear saw vibration machining, if the tension of the linear saw that acts on the control motor becomes smaller, because the position of the control motor along the linear extension direction of the linear saw stays relatively fixed, the torque of the control motor will decrease to balance the tension of the linear saw; and the torque of the control motor in this case is monitored: if the torque of the control motor becomes smaller, the positions of the carrying mechanisms at two ends of the linear saw is fine-tuned to increase the relative distance between the carrying mechanisms at two ends of the linear saw along the linear extension direction of the linear saw, so that the torque of the control motor is restored to the preset value range.

8. After machining a section of cutter gap of the cutting die plate is finished, the clamping tool heads of the two carrying mechanisms stop vibration synchronously; monitoring of a change in the torque of the control motor and adjustment of positions of the carrying mechanisms by the control motor can be suspended; a locking device of a clamping tool head on one side quickly releases one end of the linear saw; and as driven by the control motor, the clamping tool head drives the linear saw to withdraw from the machining position of the cutting die plate from an ending position of the cutter gap, so that machining of a section of cutter gap of the cutting die plate is ended.

9. When the linear saw withdraws from the machining position of the cutting die plate, the clamping tool head on the other side fixedly clamps one end of the linear saw, and the linear saw limiting device supports the other end of the linear saw. The clamping tool head drives the linear saw to moves with the linear saw limiting device and the other end of the linear saw; after passing the bridge position, the linear saw reaches a start machining position of another section of cutter gap of the cutting die plate, preparing to start machining of another section of cutter gap of the cutting die plate.

10. After machining of all the curved, arc and short-line cutter gaps to be machined on the cutting die plate is finished, the numerical control saw machine start machining a longer straight-line cutter gap as needed with a circular saw in the tool heads 70.

11. The circular saw performs high-speed cutting on the longer straight-line cutter gap among the cutter gap line patterns, to complete most of the cutter gap machining operations; and remaining R-angle portions left on two ends of the straight-line cutter gap that may not be machined with the circular saw are machined with one milling cutter in the tool heads or with the linear saw again.

12. After finishing machining of all the cutter gaps to be machined on the cutting die plate, the numerical control saw machine performs auxiliary machining on the cutting die plate as needed: selectively performs half-bridge milling as needed with a milling cutter in the tool heads 70, to mill out a required half-bridge cutter gap at the bridge position; selectively carve and mill the cutting die plate as needed with a milling cutter in the tool heads 70, wherein, carving and milling can be respectively carried out from both sides of the cutting die plate; or, selectively writes on the cutting die plate as needed with a pen head in the tool heads 70 so as to record related information of the cutting die plate.

13. The milling cutter in the tool heads 70 is used to cut the desired cutting die plate from the material. So far, machining of the cutting die plate with the numerical control saw machine is completed.

The milling cutters in the above-described steps can be a same milling cutter or different milling cutters.

The content and order of the respective steps in the above-described machining method can be selected and adjusted according to actual machining needs.

The above-described machining method is only described with the cutting die plate as an example, but machining involving other workpieces and other machining methods will not be limited.

The numerical control saw machine according to the embodiment of the present disclosure is described with the cutting die plate as an example, but the numerical control saw machine is not limited to the cutting die plate industry, and is also applicable to other industries suitable for reciprocating vibration cutting with a linear saw, for example, machining of an advertising plate material, machining of a foam plate material, machining of a furniture material, etc.

The material of the workpiece of the numerical control sawing machine according to the embodiment of the present disclosure can be solid materials such as wood, a PVC material, a bakelite material, an acrylic material, plastic, aluminum, iron, and copper.

The numerical control saw machine apparatus and the machining method according to the embodiments of the present disclosure using a modern numerical control technology can precisely adjust periodic fluctuation of the tensile forces on two ends of the linear saw in real time (with a control level in milliseconds (ms), and a feedback level in microseconds (μs) at most) with almost no hysteresis, and can control the tensile force fluctuation amplitude within a precise and relatively small range, so that the preloaded tensile force of the linear saw can be set as large as possible; and large preloaded tensile force of the linear saw, together with smaller tensile force fluctuation amplitude of the linear saw during machining, can greatly enhance precision and machining quality of reciprocating cutting with the linear saw, and greatly improve machining accuracy of reciprocating cutting with the linear saw.

The solution of the present disclosure is practical; during actual machining with the linear saw, the transverse machining resistance is constantly changing at different positions of machining, or with respect to different materials, or in a case of a heterogeneous machining material, etc., so the tension on two ends of the linear saw also changes continuously; the solution of the present disclosure can adjust the tensile force on two ends of the linear saw in real time, to maintain the same within a precise range, so that machining accuracy is also uniform; under the premise of uniform machining accuracy, quantitative compensation is further performed by using the numerical control technology, which, thus, greatly reduces positional accuracy deviation during reciprocating cutting with the linear saw, enhances quality of reciprocating cutting with the linear saw of the numerical control saw machine, can effectively reduce the yield phenomenon of the linear saw and improve the service life of the linear saw.

During machining, an external force in the transverse direction experienced by the linear saw is constantly changing, and in order to maintain the tension on two ends of the linear saw basically constant, it is necessary to monitor and detect the tensions on two ends of the linear saw, and quickly adjust the distance between the two ends of the linear saw according to monitoring and detection results, so as to achieve the purpose of maintaining the tensions on two ends of the linear saw. The numerical control saw machine according to the embodiment of the present disclosure controls the tension on two ends of the linear saw by controlling the torque of the servo motor; when subjected to resistance in the transverse direction during machining with the linear saw, the linear saw generates distortion such as bending or twisting, so that the tensile force on the linear saw increases, resulting in increase in the tension on two ends of the linear saw; the servo motor, in order to maintain a position, adjusts the torque to balance the increased tension; after monitoring the increase in the torque of the servo motor, the numerical control saw machine control system quickly fine-tunes and reduces a relative distance of the carrying mechanisms at two ends of the linear saw to restore the torque of the servo motor that controls the tensile force within a preset value range, so that the tension on the linear saw accurately maintains within a small value range; and vice versa. Just because the fluctuation amplitude of the tensile force is small, the preloaded tensile force for machining with the linear saw can be set to be close to the maximum value of the tensile strength of the linear saw, and increase in the preloaded tensile force can greatly reduce bending or twisting and distortion generated by the linear saw during reciprocating cutting, which, thus, can enhance quality of reciprocating cutting with the linear saw, and greatly improve reciprocating cutting accuracy of the linear saw.

The foregoing embodiments merely are exemplary embodiments of the present disclosure, and not intended to define the scope of the present disclosure, and the scope of the present disclosure is determined by the appended claims.

The invention claimed is:

1. A method for machining a plate material by using a linear saw, comprising:
   monitoring tensile forces on two ends of the linear saw by monitoring torque of a servo motor configured for controlling tensile forces on two ends of the linear saw, when machining the plate material with the linear saw,
   tuning and reducing a distance between the two ends of the linear saw and enabling the torque of the servo motor to be restored to or maintained within a preset range relative to a first preset threshold upon monitoring that the torque of the servo motor increases or becomes more than the first preset threshold,
   tuning and increasing the distance between the two ends of the linear saw and enabling the torque of the servo motor to be restored to or maintained within the preset range relative to a second preset threshold upon monitoring that the torque of the servo motor decreases or becomes smaller than the second preset threshold.

2. The method according to claim 1, wherein, the torque of the servo motor is preset to enable the tensile forces on two ends of the linear saw to approach a maximum tensile force close or equal to a maximum tensile strength of the linear saw.

3. The method according to claim 1, wherein, the linear saw further comprises two carrying mechanisms each connected to one of the two ends of the linear saw, and the method further comprises:
   adjusting a relative position of the two carrying mechanisms by the servo motor to adjust the distance between the two ends of the linear saw.

4. The method according to claim 1, wherein,
   monitoring the tensile forces on two ends of the linear saw comprises: monitoring the torque of the servo motor and feeding it the torque back in microseconds at most, and
   tuning the distance between the two ends of the linear saw comprises: adjusting the distance between the two ends of the linear saw in milliseconds.

5. A numerical control saw machine apparatus, comprising:
   two carrying mechanisms, each connected to one of two ends of a linear saw;
   at least one control motor, configured for adjusting a distance between the two carrying mechanisms;
   a pair of vibration motors, configured for driving a vibration of the two carrying mechanisms; and
   a control system, configured for monitoring a change in a torque of the control motor and driving the control motor to adjust the distance between the two carrying mechanisms by the vibration based on the monitored change in the torque of the control motor.

6. The numerical control saw machine apparatus according to claim 5, wherein, the control motor is configured to, when it is monitored that the torque of the control motor increases or becomes larger than a first preset threshold, adjust the distance between the two carrying mechanisms to reduce a distance between the two ends of the linear saw and enable the torque of the control motor to be restored to or maintained within a preset range relative to the first preset threshold,
   the control motor is configured to, when it is monitored that the torque of the control motor decreases or becomes smaller than a second preset threshold, adjust the distance between the two carrying mechanisms to increase the distance between the two ends of the linear saw and enable the torque of the control motor to be restored to or maintained within the preset range relative to the second preset threshold.

7. The numerical control saw machine apparatus according to claim 6, wherein, the torque of the control motor is preset to enable tensile forces on two ends of the linear saw to approach a maximum tensile force close or equal to a maximum tensile strength of the linear saw.

8. The numerical control saw machine apparatus according to claim 5, wherein, the control system motors and feeds back the torque of the control motor in microseconds at most, and the at least one control motor adjusts the distance between the two ends of the linear saw in milliseconds.

9. The numerical control saw machine apparatus according to claim 5, wherein, each of the two carrying mechanisms is provided with one clamping tool head fixed relative to the carrying mechanism, and each of the two clamping tool heads of the two carrying mechanisms clamps and is fixed relative to one of the two ends of the linear saw.

10. The numerical control sawing machine apparatus according to claim 9, wherein, the two vibration motors are each arranged on and fixed relative to one of the two carrying mechanisms, and the two vibration motors are configured to drive the two clamping tool heads of the two carrying mechanisms, enabling the two clamping tool heads to vibrate synchronously.

11. The numerical control sawing machine apparatus according to claim 9, wherein, at least one other tool head is arranged on the carrying mechanism and is located adjacent to the clamping tool head of the carrying mechanism.

12. The numerical control saw machine apparatus according to claim 5, wherein, the numerical control saw machine apparatus comprises a machining platform configured for fastening a workpiece, and the two carrying mechanisms are arranged on upper and lower sides of the workpiece when the workpiece is fastened to the machining platform.

13. The numerical control saw machine apparatus according to claim 12, wherein, the numerical control saw machine apparatus is provided with a dust suction device at or near a machining position of the workpiece when the workpiece is fastened to the machining platform.

14. The numerical control saw machine apparatus according to claim 12, wherein, one or more of a locking tool and a pressing platform are adopted to fasten the workpiece to the machining platform.

15. The numerical control saw machine apparatus according to claim 5, wherein, the numerical control saw machine apparatus comprises two beams each configured for bearing one of the two carrying mechanisms, a transverse motor configured for transversely moving the two beams, and a longitudinal motor configured for longitudinally moving the two carrying mechanisms on the two beams.

16. The numerical control saw machine apparatus according to claim 5, wherein, the numerical control saw machine apparatus comprises two rotary motors each arranged on one of the two carrying mechanisms and the two rotary motors are configured for driving the two ends of the linear saw to rotate.

17. The numerical control sawing machine apparatus according to claim 5, wherein, the at least one control motor comprises two control motors, each of the two control motors is provided at one of the two carrying mechanisms.

18. The numerical control saw machine apparatus according to claim 5, wherein, the numerical control saw machine apparatus comprises a linear saw limiting device with a slit structure arranged between the two ends of the linear saw to allow the linear saw to pass through the slit structure of the linear saw.

19. The numerical control saw machine apparatus according to claim 5, wherein, the numerical control saw machine apparatus comprises a handwheel device configured for adjusting a position of the linear saw.

* * * * *